(12) United States Patent
Yu et al.

(10) Patent No.: US 9,495,993 B2
(45) Date of Patent: Nov. 15, 2016

(54) HOLOGRAPHIC DEVICE AND METHOD FOR DATA READING USING THE SAME

(71) Applicant: National Central University, Taoyuan (TW)

(72) Inventors: Yeh-Wei Yu, Taoyuan (TW);
Ching-Cherng Sun, Taoyuan (TW)

(73) Assignee: National Central University, Taoyuan (TW)

(*) Notice: Subject to any disclaimer, the term of this patent is extended or adjusted under 35 U.S.C. 154(b) by 0 days.

(21) Appl. No.: 15/011,630

(22) Filed: Jan. 31, 2016

(65) Prior Publication Data
US 2016/0225397 A1    Aug. 4, 2016

Related U.S. Application Data

(60) Provisional application No. 62/109,634, filed on Jan. 30, 2015.

(30) Foreign Application Priority Data

Sep. 18, 2015    (TW) ................... 104130979

(51) Int. Cl.
*G11B 7/0065*    (2006.01)

(52) U.S. Cl.
CPC .................. *G11B 7/0065* (2013.01)

(58) Field of Classification Search
None
See application file for complete search history.

(56) References Cited

U.S. PATENT DOCUMENTS

| 5,222,103 A | 6/1993 | Gross |
| 5,339,305 A | 8/1994 | Curtis et al. |
| 5,446,710 A | 8/1995 | Gardner et al. |
| 2003/0030819 A1 | 2/2003 | Kuechel |
| 2009/0213717 A1 | 8/2009 | Matsuzaki et al. |
| 2010/0074089 A1 | 3/2010 | Smith et al. |

FOREIGN PATENT DOCUMENTS

| TW | 561277 | 11/2003 |
| WO | 2005024488 A1 | 3/2005 |
| WO | 2008045275 A2 | 4/2008 |
| WO | 2014115129 A2 | 7/2014 |

OTHER PUBLICATIONS

Dany-Sebastien Ly-Gagnon et al., "Coherent Detection of Optical Quadrature Phase-Shift Keying Signals With Carrier Phase Estimation", Journal of Lightwave Technology, vol. 24, No. 1, pp. 12-21, Jan. 2006.
Debabrata Saha et al., "Quadrature-Quadrature Phase-Shift Keying", IEEE Transactions on Communications, vol. 37, No. 5, pp. 437-448, May 1989.
Emmett N. Leith et al., "Reconstructed Wavefronts and Communication Theory," Journal of the Optical Society of America, vol. 52, No. 10, pp. 1123-1130, Oct. 1962.
Emmett N. Leith et al., "Wavefront Reconstruction with Continuous-Tone Objects," Journal of the Optical Society of America, vol. 53, No. 12, pp. 1377-1381, Oct. 1963.

*Primary Examiner* — Peter Vincent Agustin
(74) *Attorney, Agent, or Firm* — CKC & Partners Co., Ltd.

(57) ABSTRACT

A holographic device includes a holographic storage device, a shearing interferometer, and an optical receiver. The holographic storage device is configured to provide a disk with a reading light beam to make the reading light beam become a diffracted light beam after the reading light beam is diffracted in the disk. The shearing interferometer is configured to receive the diffracted light beam and to transform the diffracted light beam into a first light beam and a second light beam. The optical receiver is configured to receive the first light beam and the second light beam provided by the shearing interferometer.

21 Claims, 13 Drawing Sheets

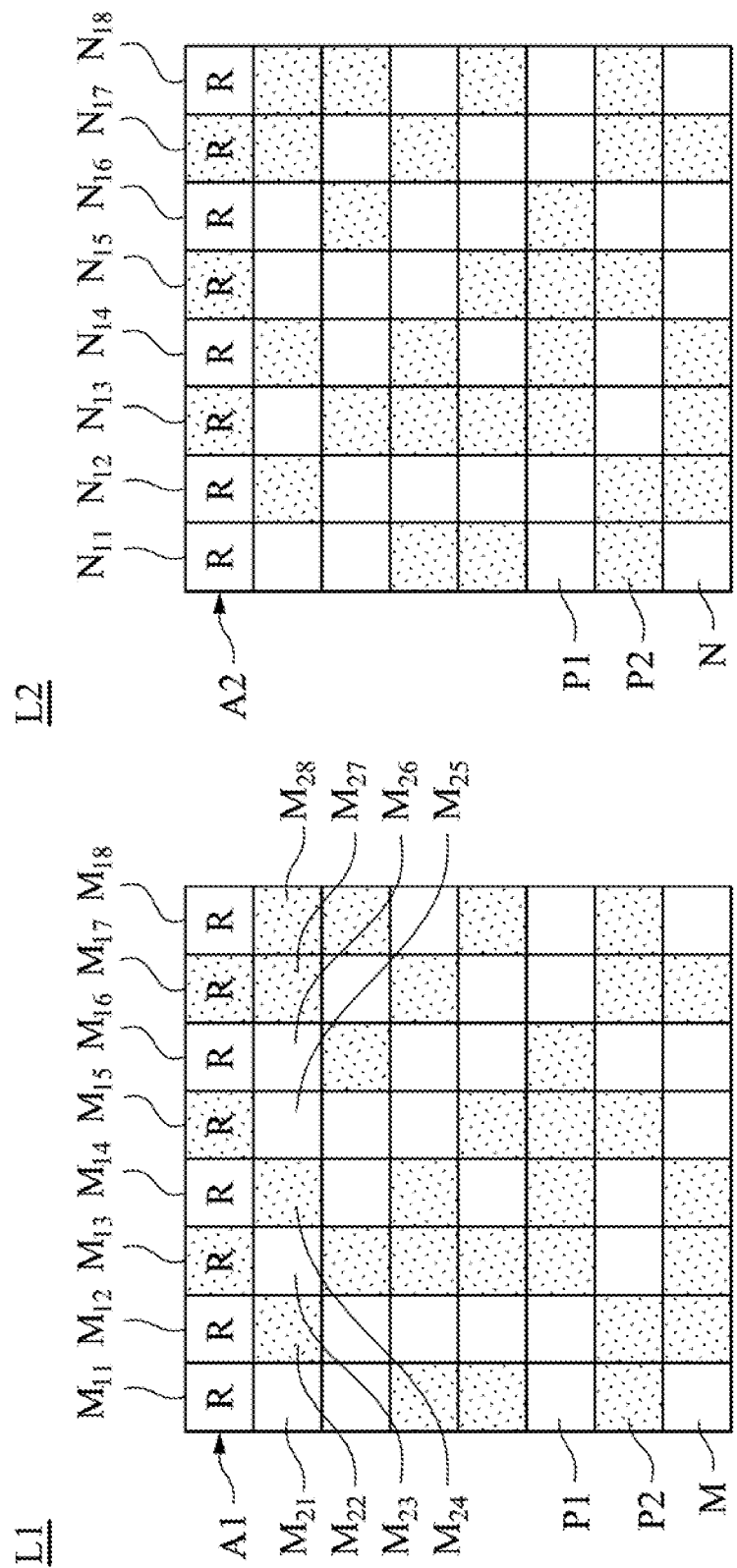

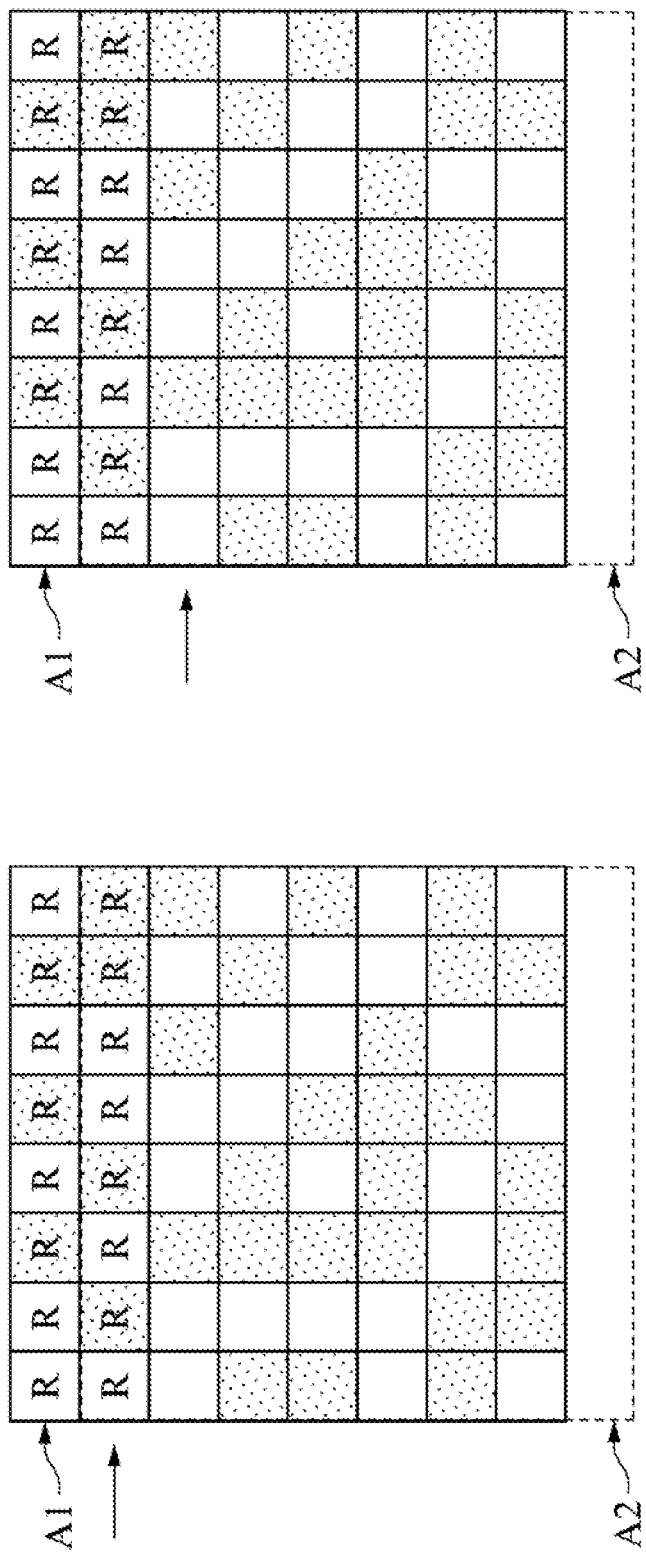

HOLOGRAPHIC DEVICE AND METHOD FOR DATA READING USING THE SAME

RELATED APPLICATIONS

This application claims the priority benefit of U.S. provisional application No. 62/109,634, filed on Jan. 30, 2015, and Taiwanese application No. 104130979, filed on Sep. 18, 2015. The entirety of the above-mentioned patent applications are hereby incorporated by reference herein and made a part of specification.

BACKGROUND

Technical Field

The present disclosure relates to a holographic device and a method for reading data by a holographic device.

Description of Related Art

Along with the development of technology, electronic files require more and more storage capacity. A typical way of storing data involves recording magnetic or optical changes on the surface of a recording medium as the storage of data. Examples of such recording mediums include floppy disks and compact discs. With the rapid increase in the requirement of storage capacity for electronic files, the attention starts to zoom in holographic storage technology.

As to the holographic storage technology, image data can be written into a recording medium (i.e., a photosensitive medium) via interference between a signal light beam and a reference light beam. When reading the recording medium, the image data can be re-generated by irradiating the reference light beam into the recording medium (photosensitive medium), so as to produce a diffracted light beam through the diffraction. Next, the diffracted light beam is read as digital data by a receiver.

In compiling the diffracted light beam into the digital data, since the diffracted light beam may be affected by the noise, the diffracted light beam may have to be read many times by the receiver to accurately calculate the data and eliminate the noise. However, repeatedly performing the reading operation extends the period of compiling the diffracted light beam into the digital data and decreases the reading efficiency of the detector.

SUMMARY

An aspect of the present disclosure provides a holographic device of the present disclosure can transform a diffracted light beam into a first light beam and a second light beam through a shearing interferometer, in which a first imaging zone and a second imaging zone are formed on an optical receiver by the first light beam and the second light beam, respectively. With a data point corresponding to an initial reference signal point within the first imaging zone and the second imaging zone, the phases of first data storage cells of the first imaging zone can be calculated by the data point having the given phase. After the phases of the first data storage cells of the first imaging zone are calculated the holographic device can read and obtain data stored in a disk. With the method for data reading of the present disclosure the optic receiver can read and obtain the phase information stored in the disk by reading the diffracted light beam once, such that the time of reading the disk by the holographic device is shortened.

An aspect of the present disclosure provides a holographic device including a holographic storage device, a shearing interferometer, and an optical receiver. The holographic storage device is configured to provide a disk with a reading light beam to make the reading light beam become a diffracted light beam after the reading light beam is diffracted in the disk. The shearing interferometer is configured to receive the diffracted light beam and to transform the diffracted light beam into a first light beam and a second light beam. The optical receiver is configured to receive the first light beam and the second light beam provided by the shearing interferometer, In some embodiments, the holographic storage device includes a light-source module disposed to provide a signal light beam, and the signal light beam provided by the light-source module has an initial reference signal point In some embodiments, the shearing interferometer includes one of a reflective shearing plate and a transparent shearing plate.

In some embodiments, the holographic device further comprises an afocal system. The afocal system is disposed between the shearing interferometer and the optical receiver, in which the afocal system is configured to minify images formed on the optical receiver by the first light beam and the second light beam which are provided by the shearing interferometer.

In some embodiments, the shearing interferometer includes a transparent substrate and a dielectric layer. The transparent substrate has a first surface and a second surface, in which the first surface and the second surface are opposite to each other and not parallel to each other. The dielectric layer is disposed on the first surface and is parallel to the first surface.

In some embodiments a thickness of the dielectric layer greater than 0 μm and is smaller than or equal to 10 μm.

In some embodiments, the holographic device further includes an afocal system. The afocal system is disposed between the shearing interferometer and the optical receiver, in which the afocal system is configured to magnify an image formed on the optical receiver by the first light beam and the second light beam which are provided by the shearing interferometer.

In some embodiments, the holographic device further includes a first lens, a second lens, and a low-pass filter. The first lens and the second lens are disposed between the holographic storage device and the shearing interferometer, and the diffracted light beam traveling' from the holographic storage device to the shearing interferometer passes through the first lens and the second lens in sequence. The low-pass filter is disposed between the first lens and the second lens.

In some embodiments, imaging zones formed on the optical receiver by the first light beam and the second light beam provided by the shearing interferometer are a first imaging zone and a second imaging zone respectively. The first imaging zone and the second imaging zone have the same size and the first imaging zone is partially overlapped with the second imaging zone.

In some embodiments, a longitudinal-distance difference and a lateral-distance difference are present between the first imaging zone and the second imaging zone. A ratio of the lateral-distance difference to the longitudinal-distance difference is equal to tan θ, and 0°≤θ≤90°.

In some embodiments, the shearing interferometer is disposed to allow a lateral-distance difference or a longitudinal-distance difference between the first imaging zone and the second imaging zone is N times the minimum pixel unit of the optical receiver, and N is a positive integer.

In some embodiments, the shearing interferometer is formed by a first converging lens, a second converging lens, and an optical grating unit. The first converging lens and the second converging lens are disposed between the holographic storage device and the optical receiver, in which the diffracted light beam traveling from the holographic storage device to the optical receive passes through the first converging lens and the second converging lens in sequence. The optical grating unit is disposed between the first converging lens and the second converging lens, In some embodiments, the optical grating unit includes a first optical grating and a second optical grating. The second optical grating is disposed to be parallel to the first optical grating, in which the diffracted light beam traveling from the first converging lens to the second converging lens passes through the first optical grating and the second optical grating in sequence.

In some embodiments, the optical grating unit includes one of a blazed grating and a double frequency grating.

An aspect of the present disclosure provides a method for reading data by a holographic device including a number of steps. A disk is provided with a signal light beam through a holographic storage device, in which the signal light beam has an initial reference signal point such that information corresponding to the initial reference signal point is recorded in the disk. The disk is provided with a reading light beam throngh the holographic storage device such that the reading light beam is diffracted in the disk to become a diffracted light beam, in which the diffracted light beam has a data point corresponding to the initial reference signal point. The diffracted light beam is transformed into a first light beam and a second light beam which are parallel to each other through a shearing interferometer. The first light beam and the second tight beam are guided to an optical receiver, in which imaging zones formed on the optical receiver by the first light beam and the second light beam are a first imaging zone and a second imaging zone respectively. The first imaging zone and the second imaging zone have the same size, and the first imaging zone is partially overlapped with the second imaging zone.

In some embodiments, the first imaging zone has first data storage cells, and each of the first data storage cells has one of a first phase and a second phase. The second imaging zone has second data storage cells, and each of the second data storage cells has one of the first phase and the second phase. The first data storage cells and the second data storage cells which are present in the overlapped zone of the first imaging zone and the second imaging zone are fully overlapped with each other.

In some embodiments, the method further includes transforming the first light beam and the second light beam provided by the shearing interferometer from a phase distribution into a intensity distribution through interference according to the first data storage cells and the second data storage cells which are fully overlapped with each other in the overlapped zone of the first imaging zone and the second imaging zone.

In some embodiments, the step of transforming the first light beam and the second light beam provided by the shearing interferometer from the phase distribution into the intensity distribution through the interference further includes a number of steps. The intensity of a set of the first data storage cell and the second data storage cell which are fully overlapped with each other on the optical receiver is defined as a first intensity, as the set of the first data storage cell and the second data storage cell which are fully overlapped with each other both have one of the first phase and the second phase. The intensity of another set of the first data storage cell and the second data storage cell which are fully overlapped with each other on the optical receiver is defined as a second intensity, as another set of the first data storage cell and the second data storage cell which are fully overlapped with each other have the first phase and the second phase respectively.

In some embodiments, the method further includes calculating the phase of each of the first data storage cells of the first imaging zone through the intensity distribution of the first light beam and the second light beam and the data point corresponding to the initial reference signal point after transforming the first light beam and the second light beam provided from the phase distribution into the intensity distribution.

In some embodiments, the step of calculating the phase of each of the first data storage cells of the first imaging zone further includes calculating from the data point corresponding to the initial reference signal point in one of the first data storage cells toward the other set of the first data storage cell and the second data storage cell which are fully overlapped with each other.

BRIEF DESCRIPTION OF THE DRAWINGS

FIG. 3A is a schematic diagram of a first imaging zone formed on the optical receiver by the first light beam illustrated in FIG. 1;

FIG. 3B is a schematic diagram of a second imaging zone formed on the optical receiver by the second light beam illustrated in FIG. 1;

FIGS. 4A and 4B are schematic diagrams of performing a reading operations of the holographic device illustrated in FIG. 1 with respect to the first light beam and the second light beam;

DETAILED DESCRIPTION

Figure 1:
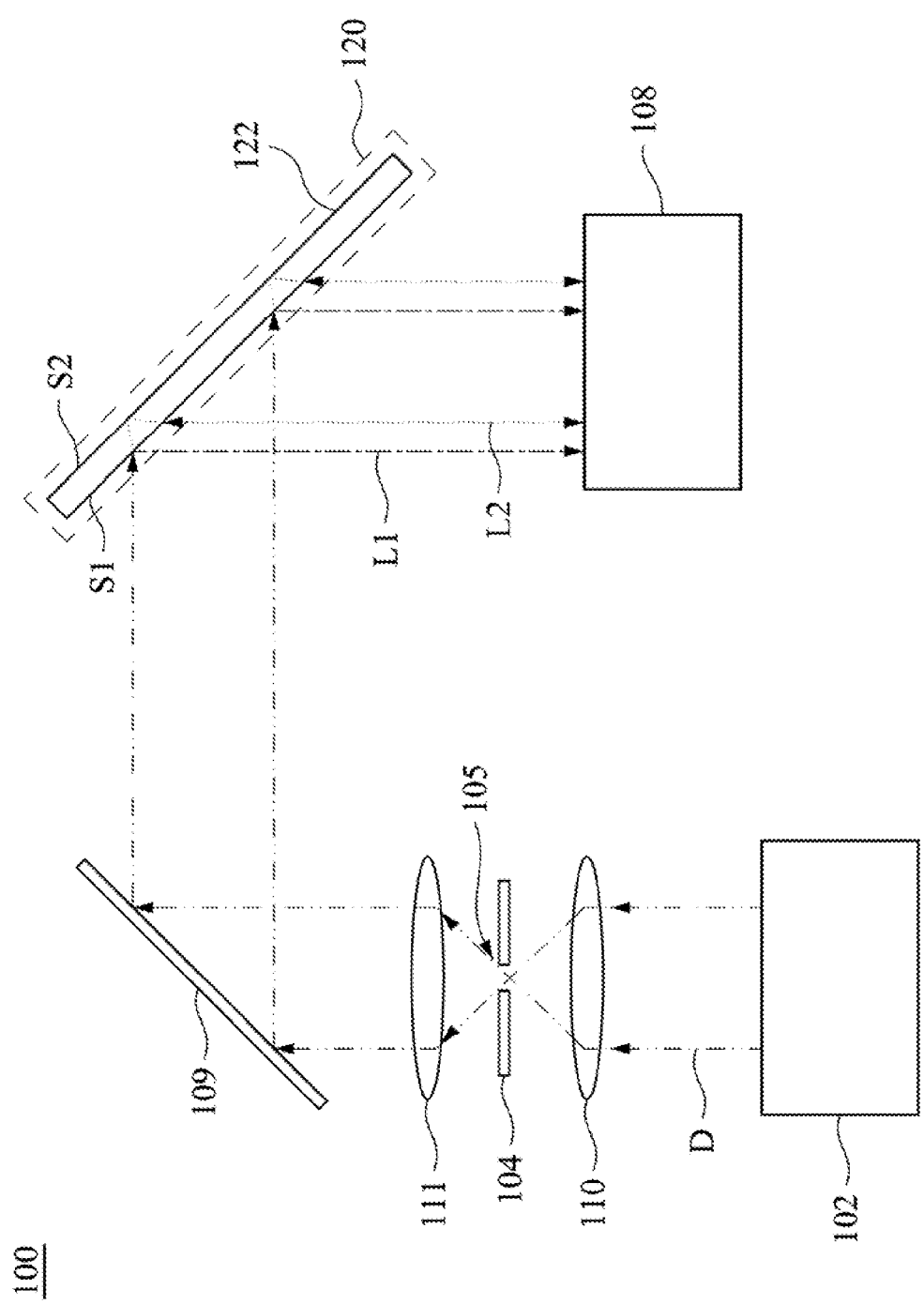
FIG. 1 is a schematic diagram of an optical path of a holographic device according to a first embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a holographic storage system, when data is written into a holographic storage disk, a writing light beam formed by a signal light beam and a reference light beam is required to perform exposure and interference in a certain area of a photosensitive unit. When reading the image data, the image data can be generated by emitting the reference light beam into the recording medium (photosensitive medium) again, so as to produce a diffracted light beam through the diffraction. Next, the generated diffracted light beam is read by a receiver. In the step of reading the diffracted light beam, in order to perform an accuracy calculation with respect to the diffracted light beam and prevent the calculation result from being affected by the noise, the number of performing the reading operation with respect to the diffracted light beam by the receiver may be many times. However, performing the reading operation many times may prolong the period of the reading the disk with the diffracted light beam by the holographic device, such that a reading performance and a reading efficiency of the holographic device are decreased.

In view of this, a holographic device of the present disclosure can transform a diffracted light beam into a first light beam and a second light beam through a shearing interferometer, and a first imaging zone and a second imaging zone are formed on an optical receiver by the first light beam and the second light beam. By a data point corresponding to the initial reference signal point within the first imaging zone and the second imaging zone, the phases of first data storage cells of the first imaging zone can be calculated by the data point having a given phase. After the phases of first data storage cells of the first imaging zone is calculated, the data stored in a disk can be read and obtained by the holographic device. In other words, after the holographic device reads the diffracted light beam once, the phase information stored in the disk can be read and obtained by the optic receiver, such that the time of reading the disk by the holographic device is shortened. Moreover, under the reading time is shortened, the holographic device still can get the data in high quality, such that a reading performance and a reading efficiency of the holographic device are improved.

FIG. 1 is a schematic diagram of an optical path of a holographic device 100 according to a first embodiment of this disclosure. The holographic device 100 includes a holographic storage device 102, a low-pass filter 104, a shearing interferometer 120, an optical receiver 108, a first mirror 109, a first lens 110, and a second lens 111, in which the holographic storage device 102 can be arranged as a coaxial system or a monocular system. In an optical path of a diffracted light beam D, the diffracted light beam D travels from the holographic storage device 102 to the optical receiver 108 through the first lens 110, the low-pass filter 104, the second lens 111, the first mirror 109, the shearing interferometer 120 in sequence. In other embodiments, the diffracted light beam D may travel from the holographic storage device 102 to the optical receiver 108 through the shearing interferometer 120.

In addition, the configuration of the holographic device 100 illustrated in FIG. 1 represents the order that the diffracted light beam D passes therethrough and is not the relative positions among the elements. Thus, a person having ordinary skill in the art may design the relative positions among the elements according to the design of the optical path of the diffracted light beam D. For example, in a design according to a different optical path of the diffracted light beam D, the first mirror 109 can be omitted.

Figure 2A:
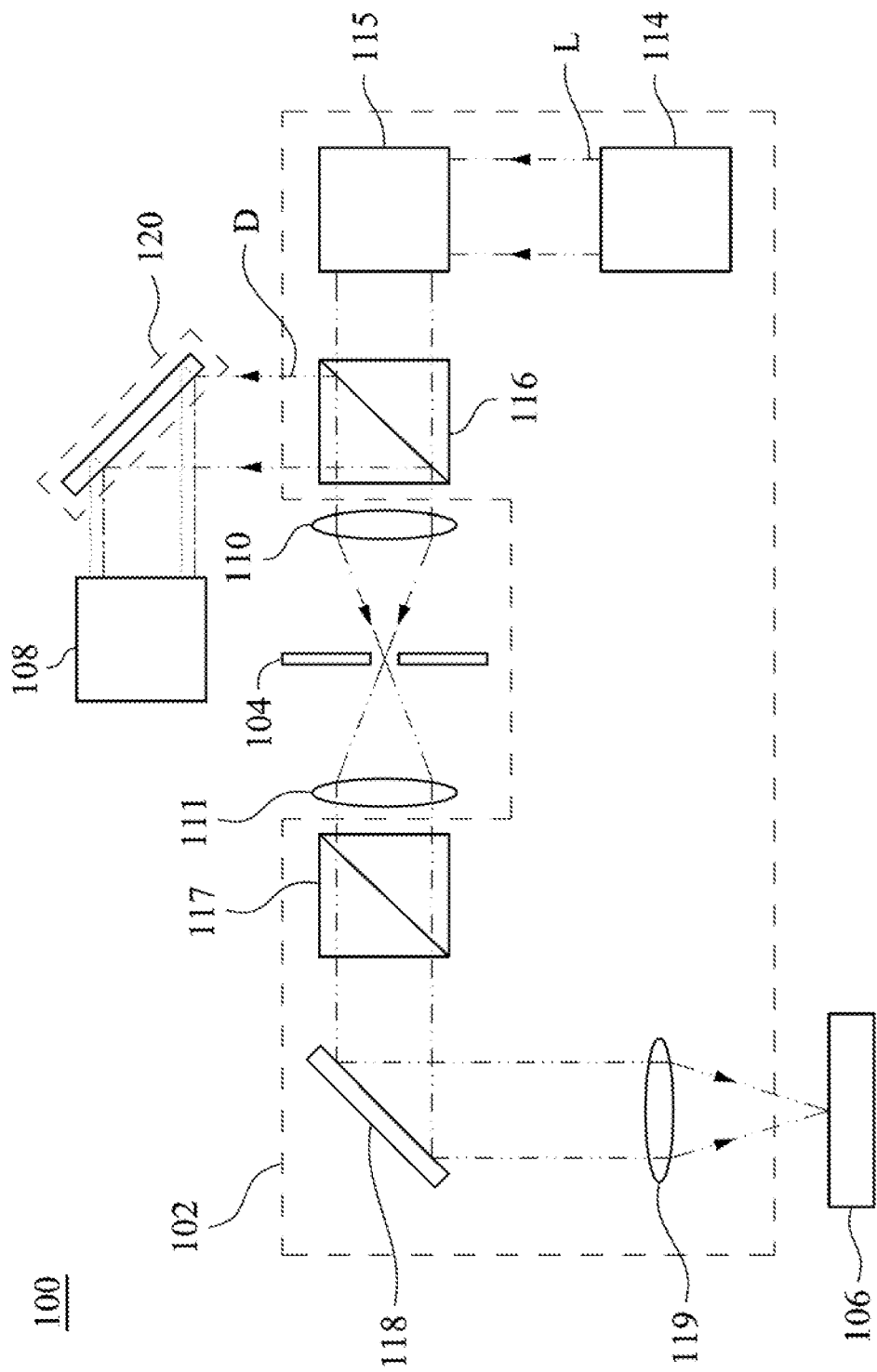
FIG. 2A is a configuration of arranging the holographic storage device of the holographic device illustrated in FIG. 1 as a coaxial system.
Figure 2B:
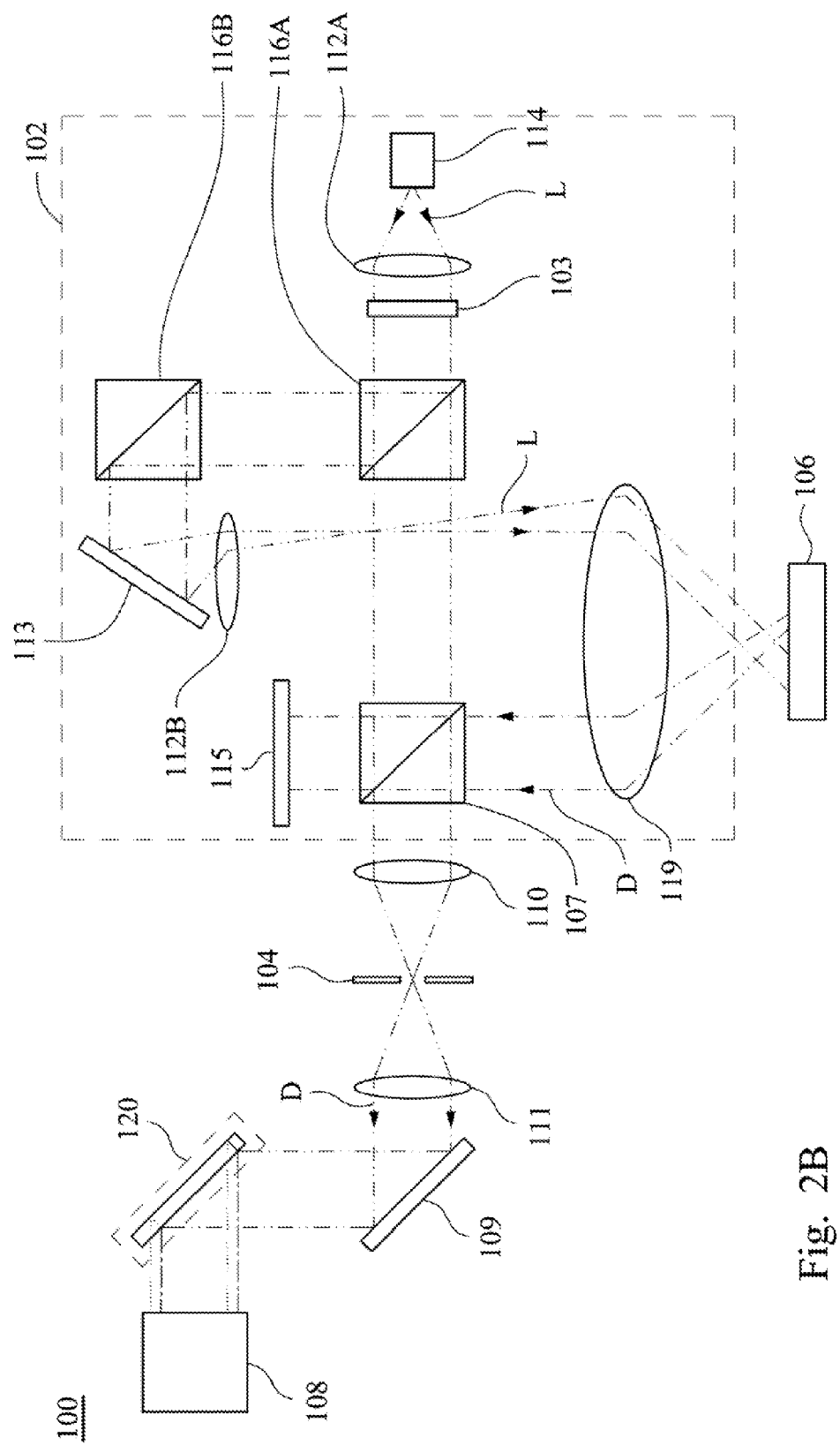
FIG. 2B is a configuration of arranging the holographic storage device of the holographic device illustrated in FIG. 1 as a monocular system.

FIG. 2A is a configuration of arranging the holographic storage device 102 of the holographic device 100 illustrated in FIG. 1 as a coaxial system. FIG. 2B is a configuration of arranging the holographic storage device 102 of the holographic device 100 illustrated in FIG. 1 as a monocular system.

As shown in FIG. 2A, the holographic storage device 102 of the holographic device 100 is arranged as the coaxial system, in which the holographic storage device 102 includes a light-source module 114, a spatial light modulator (SLM) 115, a polarizing beam splitter 116, a dichroic mirror 117, a second mirror 118, and an object lens 119, in which the first lens 110 and the second lens 111 are disposed between the polarizing beam splitter 116 and the dichroic mirror 117. In addition, a person having ordinary skill in the art may choose a proper SLM 115 with different type, for example, a transparent type SLM, a reflective type SLM or a combination thereof. Furthermore, in the holographic storage device 102 of the holographic device 100 which is arranged as the coaxial system, the first mirror 109 illustrated in FIG. 1 can be omitted.

When a read operation is performed, a reading light beam L is provided by the light-source module 114, such that the reading light beam L can travel from the light-source module 114 to the disk 106 through the SLIM 115, the polarizing beam splitter 116, the first lens 110m the low-pass filter 104, the second lens, the dichroic mirror 117, the second reflective mirror 118, and the object lens 119 in sequence. The reading light beam L can become a diffracted light beam D after the reading light beam L is diffracted in the disk 106. Next, the diffracted light beam D can reversely travel along the original optical path of the reading light beam L to the polarizing beam splitter 116, and then the diffracted light beam D is guided to the shearing interferometer 120 by the polarizing beam splitter 116. The optical receiver 108 is configured to receive at least one light beam provided by the shearing interferometer 120.

As shown in FIG. 2B, the holographic storage device 102 of the holographic device 100 is arranged as the monocular system, in which the holographic storage device 102 includes a half-wave plate 103, a beam splitter 107, a galvo mirror 113, a light-source module 114, a SLM 115, guiding lenses 112A and 112B, polarizing beam splitters 116A and 116B, and an object lens 119, in which the first lens 110 and the second lens 111 are disposed between the beam splitter 107 and the first lens 110. In addition, a person having ordinary skill in the art may choose a proper SLM 115 with different type, for example, a transparent type SLM, a reflective type SLIM or a combination thereof. Furthermore, in the present embodiment, the beam splitter 107 can be replaced by a polarizing beam splitter. In some embodiments in which the beam splitter 107 is replaced by a polarizing beam splitter, a half-wave plate (not illustrated) is disposed between the polarizing beam splitter 116A and the polarizing beam splitter, which is disposed at the same position as the beam splitter 107 illustrated in FIG. 2B.

When a read operation is performed, a reading light beam L is provided by the light-source module 114, such that the reading light beam L can travel from the light-source module 114 to the disk 106 through the guiding lens 112A, the half-wave plate 103, the polarizing beam splitters 116A and 116B, the galvo mirror 113, the guiding lens 112B, and the object lens 119 in sequence. The reading light beam L can become a diffracted light beam D after the reading light beam L is diffracted in the disk 106. Next, the diffracted light beam can travel from the disk 106 to the first mirror 109 through the object lens 119 the beam splitter 107, the SLM 115, the beam splitter 107, the first lens 110 the low-pass filter 104, and the second lens 111 in sequence, and then the diffracted light beam D is guided to the shearing interferometer 120 by the first mirror 109. The optical receiver 108 is configured to receive at least one light beam provided by the shearing interferometer 120.

In addition, the configurations of the elements of the holographic device 100 illustrated in FIGS. 2A and 2B are exemplary, but not limited thereto. A person having ordinary skill in the art may adjust the relative positions among the elements according to the design of the optical path of the diffracted light beam D.

Referring back to FIG. 1, the shearing interferometer 120 is configured to receive the diffracted light beam D and to transform the diffracted light beam D into a first light beam L1 and a second light beam L2. In the present embodiment, the shearing interferometer 120 includes a shearing plate 122. Thus, the diffracted light beam D is transformed into the first light beam L1 and the second light beam L2 which are parallel to each other by the shearing plate 122. The shearing plate 122 has a first surface S1 and a second surface S2 which are parallel to each other. The diffracted light beam D is reflected from the first surface S1 of the shearing, plate 122 to become the first light beam L1, and the diffracted light beam D is reflected from the second surface S2 of the shearing plate 122 to become the second light beam L2. The optical receiver 108 is disposed to receive the first light beam L1 and the second light beam L2 provided by the shearing plate 122.

The first lens 110 and the second lens 111 are disposed between the holographic storage device 102 and the shearing interferometer 120, and the diffracted light beam D traveling from the holographic storage device 102 to the shearing interferometer 108 passes through the first lens 110 and the second lens 111 in sequence. The low-pass filter 104 is disposed between the first lens 110 and the second lens 111. In addition, the low-pass filter 104 can have an aperture 105. The low-pass filter 104 is configured to make the diffracted light beam D passing therethrough to have lower noise in spatial frequency, thereby improving the accuracy in the reading operation of the holographic device 100 with respect to the disk 106 (see FIGS. 2A and 2B).

FIG. 3A is a schematic diagram of a first imaging zone A1 formed on the optical receiver 108 by the first light beam L1 illustrated in FIG. 1. FIG. 3B is a schematic diagram of a second imaging zone A2 formed on the optical receiver 108 by the second light beam L2 illustrated in FIG. 1.

After the reading light beam L is diffracted in the disk 106 and becomes a diffracted light beam D, the diffracted light beam D can have (or carry) the data stored in the disk 106. Therefore the first light beam L1 and the second light beam L2 transformed from the diffracted light beam D by the shearing interferometer 120 also can have (or carry) the data stored in the disk 106. In the configuration of the first light beam L1 and the second light beam L2, at least one difference between the first light beam L1 and the second light beam L2 is that a distance difference is present in a direction which is normal to the traveling directions of the first light beam L1 and the second light beam L2.

After the first light beam L1 and the second light beam L2 are received by the optical receiver 108, the date carried in first light beam L1 and the second light beam L2 from the disk 106 can be expressed as the form of phase, as shown the FIGS. 3A and 3B. A method for data reading of the present disclosure can be divided into three steps. The first step is forming imaging zones on the optical receiver 108 by the first light beam L1 and the second light beam L2, in which the imaging zones of the first light beam L1 and the second light beam L2 are overlapped with each other. The second step is obtaining an intensity distribution of the first light beam L1 and the second light beam L2 on the optical receiver 108 through the overlapped imaging zones of the first light beam L1 and the second light beam L2. The third step is calculating this intensity distribution to figure out the data carried in first light beam L1 from the disk 106, in which the calculation is performed to figure out the unknown p tease (or the phase to be calculated) from the given phase. After the calculation of the data carried in first light beam L1 is finished, the data stored in the disk 106 can be read and obtained by the holographic device 100, As described previously, in order to figure out the unknown phase (or the phase to be calculated) from the given phase, information of an initial reference signal point can be recorded in the disk 106 by the holographic device 100. In the present embodiment, when a writing operation of the holographic device 100 is performed, the light-source module 114 of the holographic storage device 102 can provide a signal light beam (not illustrated), in which the signal light beam provided by the light-source module 114 has an initial reference signal point. Therefore, when the signal light beam is written into the disk 106, the information of the initial reference can be recorded in disk 106.

Accordingly when the read operation of the holographic device 100 is performed, the diffracted light beam D formed from the reading light beam L by the diffraction in the disk 106 can have a data point corresponding to the initial reference signal point. With the diffracted light beam Q having the data point corresponding to the initial reference signal point, the data stored in the disk 106 can be figured out by the holographic device 100. The following descriptions are provided with respect to the method for data reading of the present disclosure.

As shown in FIG. 3A, an imaging zone formed on the optical receiver 108 by the first light beam L1 provided by the shearing interferometer 120 is a first imaging zone A1 The first imaging zone A1 has first data storage cells M. In the present embodiment, the first imaging zone A1 can be taken as an imaging zone with 8 columns and 8 rows (8×8), in which the number of the first data storage cells M thereof is sixty-four.

Each of the first data storage cells M has one of first phase P1 and second phase P. In the first imaging zone A1 illustrated in FIG. 3A, the first data storage cells M marked without the screentone represent the first phase P1, and the first data storage cells M marked with the screentone represent the second phase P2. The first phase P1 may be 0°, and the second phase P2 may be 180°.

For making the description succinct, the first imaging zone A1 illustrated in FIG. 3A is similarly expressed as a matrix. For example, in the first row of the first imaging zone A1, the first data storage cells M can be expressed as $M_{11}$, $M_{12}$, $M_{13}$, $M_{14}$, $M_{15}$, $M_{16}$, $M_{17}$, and $M_{18}$, in which the $M_{11}$, $M_{12}$, $M_{14}$, $M_{16}$, and $M_{18}$ have the first phase P1 (marked without the screentone) and the $M_{13}$, $M_{15}$ and $M_{17}$ have the second phase P2 (marked with the screentone). On the other hand, in the second row of the first imaging zone A1, the first data storage cells M can be expressed as $M_{21}$, $M_{22}$, $M_{23}$, $M_{24}$, $M_{25}$, $M_{26}$, $M_{27}$, and $M_{28}$, in which the $M_{21}$, $M_{23}$, $M_{25}$, and $M_{28}$ have the first phase P1 (marked without the screentone) and the $M_{22}$, $M_{24}$, $M_{27}$, and $M_{28}$ have the second phase P2 (marked with the screentone).

As shown in FIG. 3B, an imaging zone formed on the optical receiver 108 by the second light beam L2 provided by the shearing interferometer 120 is a second imaging zone A2, in which the first imaging zone A1 and the second imaging zone A2 are the rectangles having the same size. The second imaging zone A2 has second data storage cells N. Since the first imaging zone A1 and the second imaging zone A2 are the rectangles having the same size, the second imaging zone A2 can be taken as an imaging zone with 8 columns and 8 rows (8×8), in which the number of the second data storage cells N thereof is sixty-four.

Each of the second data storage cells N has one of the first phase P1 and the second phase P2. In the second imaging zone A2 illustrated in FIG. 3B, the second data storage cells N marked without the screentone represent the first phase P1, and the second data storage cells N marked with the screentone represent the second phase P2.

The second imaging zone A2 illustrated in FIG. 3B is similarly expressed as a matrix as well. For example, in the first row of the second imaging zone A2, the second data storage cells N can be expressed as $N_{11}$, $N_{12}$, $N_{13}$, $N_{14}$, $N_{15}$, $N_{16}$, $M_{17}$, and $N_{18}$, in which the $N_{11}$, $N_{12}$, $N_{14}$, $N_{16}$, and $N_{18}$ have the first phase P1 (marked without the screentone) and the $N_{13}$, $N_{15}$, and $N_{17}$ have the second phase P2 (marked with the screentone).

Furthermore, as described previously, since the information corresponding to the initial reference signal point is recorded in the disk 106, each of the diffracted light beam D and the first light beam L1 and the second light beam L2 which are transformed from the diffracted light beam D can have the data point corresponding to the initial reference signal point.

For example, in the first imaging zone A1 formed on the optical receiver by the first light beam L1, the first data storage cells M marked as the $M_{11}$, $M_{12}$, $M_{13}$, $M_{14}$, $M_{15}$, $M_{16}$, $M_{17}$, and $M_{18}$ can be the data points corresponding to the initial reference signal point. For making the description succinct, the first data storage cells M marked as the $M_{11}$, $M_{12}$, $M_{13}$, $M_{14}$, $M_{15}$, $M_{16}$, $M_{17}$, and $M_{18}$ are marked as initial reference signal points R.

Similarly, in the second imaging zone A2 formed on the optical receiver by the second light beam L2, the second data storage cells N marked as the $N_{11}$, $N_{12}$, $N_{13}$, $N_{14}$, $N_{15}$, $N_{16}$, $N_{17}$, and $N_{18}$ can be the data points corresponding to the initial reference signal point. For making the description succinct, the second data storage cells N marked as the $N_{11}$, $N_{12}$, $N_{13}$, $N_{14}$, $N_{15}$, $N_{16}$, $N_{17}$, and $N_{18}$ are marked as initial reference signal points R.

In other words, in the first imaging zone A1 and the second imaging zone A2, the phases of the first data storage cells M marked as the $M_{11}$, $M_{12}$, $M_{13}$, $M_{14}$, $M_{15}$, $M_{16}$, $M_{17}$, and $M_{18}$ and the second data storage cells N marked as the $N_{11}$, $N_{12}$, $N_{13}$, $N_{14}$, $N_{15}$, $N_{16}$, $N_{17}$, and $N_{18}$ are given, and the phases of the other first data storage cells M and the other second data storage cells N are unknown.

FIGS. 4A and 4B are schematic diagrams of performing a reading operations of the holographic device 100 illustrated in FIG. 1 with respect to the first light beam L1 and the second light beam L2. The first imaging zones A1 and the second imaging zones A2 illustrated in FIGS. 4A and 4B respectively correspond to first imaging zone A1 illustrated in FIG. 3A and the second imaging zone A2 illustrated in FIG. 3B. In addition, for making the diagrams succinct, the second imaging zones A2 are illustrated by the dot lines.

As described previously, the diffracted light beam D can be transformed into the first light beam L1 and the second light beam L2 by the shearing interferometer 120 (see FIG. 1), and the first imaging zone A1 and the second imaging zones A2 are respectively formed on the optical receiver 108 (see FIG. 1), as the first step described above. In FIGS. 4A and 46, the first imaging zone A1 and the second imaging zones A2 formed on the optical receiver 108 by the first light beam L1 and the second light beam L2 are partially overlapped with each other.

When the first imaging zone A1 and the second imaging zones A2 formed on the optical receiver 108 by the first light beam L1 and the second light beam L2 are partially overlapped with each other, in the overlapped zone of the first imaging zone A1 and the second imaging zones A2, the first data storage cells M and the second data storage cells N which are present in the overlapped zone of the first imaging zone A1 and the second imaging zone A2 are fully overlapped with each other. For example, the first data storage cells M in the second row of the first imaging zone A1 (corresponding to the first data storage cells M marked as $M_{21}$, $M_{22}$, $M_{23}$, $M_{24}$, $M_{25}$, $M_{26}$, $M_{27}$, and $M_{28}$ illustrated in FIG. 3A) are fully overlapped with the second data storage cells N in the first row of the second imaging zone A2 (corresponding to the second data storage cells N marked as $N_{11}$, $N_{12}$, $N_{13}$, $N_{14}$, $N_{15}$, $N_{16}$, $N_{17}$, and $N_{18}$ illustrated in FIG. 3B), respectively.

Next, the method for data reading is performed by transforming the first light beam L1 and the second light beam L2 provided by the shearing interferometer 120 from a phase distribution into a intensity distribution through the interference according to the first data storage cells M and the second data to rage cells N which are fully overlapped with each other in the overlapped zone of the first imaging zone A1 and the second imaging zone A2, in which the intensity distribution can be recorded with at east one intensity signal, as the second step described above.

In the step of transforming the first light beam L and the second light beam L2 from the phase distribution into the intensity distribution through the interference, the transforming step includes a number of steps. The intensity of a set of the first data storage cell M and the second data storage cell N which are fully overlapped with each other on the optical receiver 108 is defined as a first intensity, as the set of the first data storage cell M and the second data storage cell N which are fully overlapped with each other both have one of the first phase P1 and the second phase P. The intensity of another set of the first data storage cell M and the second data storage cell N which are fully overlapped with each other on the optical receiver 108 is defined as a second intensity, as another set of the first data storage cell N and the second data storage cell M which are fully overlapped with each other have the first phase P1 and the second phase P2 respectively.

In other words, the step of transforming the first light beam L1 and the second light beam L2 from the phase distribution into the intensity distribution through the interference is performed by defining the phase relationship between the set of the first data storage cell M and the second data storage cell N. The phase relationship means constructive interference or destructive interference between the set of the first data storage cell M and the second data storage cell N. For example, when a set of the first data storage cell M and the second data storage cell N which are overlapped with each other both have the same phase, the phase relationship therebetween can be taken as the constructive interference. When a set of the first data storage cell M and the second data storage cell N which are overlapped with each other both have the opposite phases, the phase relationship therebetween can be taken as the destructive interference.

In the present embodiment, the transformed intensity signal can be recorded by two-digital signal, and thus the first intensity and the second intensity in the intensity distribution can be taken as 1 and 0. In the step of transforming the first light beam L1 and the second light beam L2 from the phase distribution into the intensity distribution through the interference, the method for data reading is performed by subtracting the phases of the first data storage cell M and the second data storage cell N which are overlapped with each other, so as to define the intensity of each of the data storage cells. For example, when a set of two data storage cells which are fully overlapped with each other have phases pi and 0 (or, 0 and pi), this set of the data storage cells can be defined as 1. When a set of two data storage cells which are fully overlapped with each other have phases pi and pi (or, 0 and 0), this set of the data storage cells can be defined as 0.

After transforming the first light beam L1 and the second light beam L2 from the phase distribution into the intensity distribution through the interference, with the intensity distribution of the first light beam L1 and the second light beam L2 and the data points corresponding to the initial reference signal points R, the step of figuring out the phase of the each of the first data storage cells M can be performed, as the third step described above.

As shown by the arrow illustrated in FIG. 4A (thus, the second row of the first imaging zone A1 and the first row of the second imaging zone A2), since the first data storage cells M in the second row of the first imaging zone A1 (corresponding to the first data storage cells M marked as $M_{21}$, $M_{22}$, $M_{23}$, $M_{24}$, $M_{25}$, $M_{26}$, $M_{27}$, and $M_{28}$ illustrated in FIG. 3A) are fully overlapped with the second data storage cells N in the first row of the second imaging zone A2 (corresponding to the second data storage cells N marked as $N_{11}$, $N_{12}$, $N_{13}$, $N_{14}$, $N_{15}$, $N_{16}$, $N_{17}$, and $N_{18}$ illustrated in FIG. 3B), respectively, the optical receiver 108 can receive a plurality of the intensity signals at the different positions thereon. For example, the optical receiver 108 can receive an intensity signal formed by superposing the intensities of the first data storage cell M marked as $M_{21}$ and the second data storage cell N marked as $N_{11}$, an intensity signal formed by superposing the intensities of the first data storage cell M marked as $M_{22}$ and the second data storage cell N marked as $N_{12}$, an intensity signal formed by superposing the intensities of the first data storage cell M marked as $M_{23}$ and the second data storage cell N marked as $N_{13}$, an intensity signal formed by superposing the intensities of the first data storage cell M marked as $M_{24}$ and the second data storage cell N marked as $N_{14}$, an intensity signal formed by superposing the intensities of the first data storage cell M marked as $M_{25}$ and the second data storage cell N marked as $N_{16}$, an intensity signal formed by superposing the intensities of the first data storage cell M marked as $M_{26}$ and the second data storage cell N marked as $N_{16}$, an intensity signal formed by superposing the intensities of the first data storage cell M marked as $M_{27}$ and the second data storage cell N marked as $N_{17}$, an intensity signal formed by superposing the intensities of the first data storage cell M marked as $M_{25}$ and the second data storage cell N marked as $N_{18}$, in which the intensity signals above can be taken as 0, 1, 1, 1, 1, 0, 0, and 1, respectively, Since the phases of the second data storage cells N in the first row of the second imaging zone A2 are given (the second data storage cells N marked as the initial reference signal points R), according to the phase calculation described above, the phases of the first data storage cells M in the second row of the first imaging zone A1 can be figured out.

For example, at the position that the first data storage cell M marked as $M_{21}$ and the second data storage cell N marked as $N_{11}$ are superposed, since the intensity formed by superposing the first data storage cell M marked as $M_{21}$ and the second data storage cell N marked as $N_{11}$ is 0, the phases of the first data storage cell M marked as $M_{21}$ and the second data storage cell N marked as $N_{11}$ can be figured to be the same. Next, since the given phase of the second data storage cell N marked as $N_{11}$ is 0, the phase of the first data storage cell M marked as $M_{21}$ can be figured to be 0 as well.

On the other hand, at the position that the first data storage cell M marked as $M_{22}$ and the second data storage cell N marked as $N_{12}$ are superposed, since the intensity formed by superposing the first data storage cell M marked as $M_{22}$ and the second data storage cell N marked as $N_{12}$ is 1, the phases of the first data storage cell M marked as $M_{22}$ and the second data storage cell N marked as $N_{12}$ can be figured to be different. Next since the given phase of the second data storage cell N marked as $N_{12}$ is 0, the phase of the first data storage cell M marked as $M_{22}$ can be figured to be pi. According to this calculation rule, the phases of the first data storage cells M in the second row of the first imaging zone A1 can be figured out.

After the phases of the first data storage cells M in the second row of the first imaging zone A1 are figured out, since the phase distribution of the first imaging zone A1 and the second imaging zone A2 are the same, the phases of the second data storage cells N in the second row of the second imaging zone A2 can be obtained.

Next, As shown by the arrow illustrated in FIG. 4B (thus, the third row of the first imaging zone A1 and the second roue of the second imaging zone A2), the first data storage cells M in the third row of the first imaging zone A1 are fully overlapped with the second data storage cells N in the second row of the second imaging zone A2 respectively.

In the following descriptions, the $M_{31}$-$M_{38}$ and $N_{21}$-$N_{28}$ are not illustrated in FIG. 4B. However, the $M_{31}$-$M_{38}$ and $N_{21}$-$N_{28}$ are located at the corresponding positions of the matrix. The optical receiver 108 can receive an intensity signal formed by superposing the intensities of the $M_{31}$ and the $N_{21}$, an intensity signal formed by superposing the intensities of the $M_{32}$ and the $N_{22}$, an intensity signal formed by superposing the intensities of the $M_{33}$ and the $N_{23}$, an intensity signal formed by superposing the intensities of the $M_{34}$ and the $N_{24}$, an intensity signal formed by superposing the intensities of the $M_{35}$ and the $N_{25}$, an intensity signal formed by superposing the intensities of the $M_{36}$ and the $N_{26}$, an intensity signal formed by superposing the intensities of the $M_{37}$ and the $N_{27}$ an intensity signal formed by superposing the intensities of the $M_{38}$ and the $N_{28}$, in which the intensity signals above can be taken as 0, 1, 1, 1, 0, 1, 1 and 0, respectively. According to the calculation rule described above, since the phases of the second data storage cells N in the second row of the second imaging zone A2 are given, the phases of the first data storage cells M in the third row of the first imaging zone A1 can be figured out.

Thus, in the present embodiment, calculating the phase of each of the first data storage cells M of the first imaging zone A1 is performed by the following step. The phase calculation is begun from the data point corresponding to the initial reference signal point R in one of the first data storage cells M toward the other set of the first data storage cell M and the second data storage cell N which are fully overlapped with each other. In other words, since the phases of the first data storage cells M in the first row of the first imaging zone A1 are given, the phase calculation of the other first data storage cells M of the first imaging zone A1 is performed from the second row to the third row, the fourth row, the fifth row, the sixth row, the seventh row, and the eighth row in sequence.

As described above, the method for the data reading of the present disclosure can be performed to form the overlapped zone by the first light beam L1 and the second light beam L2, in which the overlapped zone can be received as the intensity distribution by the optical receiver 108. Next, with the data points corresponding to the initial reference signal points R within the first imaging zone A1 and the second imaging zone A2 which are formed on the optical receiver 108 by the first light beam L1 and the second light beam L2, the phases of the first data storage cells M of the first imaging zone A1 can be figured out by the data points having the given phases.

After the phases of the first data storage cells M of the first imaging zone A1 are figured out, the data stored in the disk 106 can be read and obtained by the holographic device 100. With the method for the data reading of the present disclosure, the phase information stored in the disk 106 can be obtained through reading the diffracted light beam D once by the optic receiver 108, such that the time of reading the disk 106 by the holographic device 100 is shortened. Moreover, under the reading time is shortened, the holographic device 100 still can get the data in high quality, such that a reading performance and a reading efficiency of the holographic device 100 are improved.

Furthermore, since the first light beam L1 and the second light beam L2 are transformed from the same diffracted light beam D by the shearing interferometer 120 according to the calculation rule in subtracting phase, the noise caused by the first light beam L1 and the second light beam L2 by the aberration or the disk shifting can be removed in the destructive interference, thereby improving the signal-to-noise ratio (S/N) of the holographic device 100.

However, a person having ordinary skill in the art may choose a proper phase calculation, so as to define the intensity signals in the overlapped zone of the imaged. For example, while the phase calculation described above is performed by subtracting the phases, the phase calculation described above can be performed by adding the phases.

FIGS. 5A to 5I are schematic diagrams of the signal light beams according to various embodiments, in which each of the signal light beams is provided by the holographic storage device 102 of the holographic device 100 illustrated in FIG. 1 and has at least one initial reference signal point R.

As described previously, the phases of the first data storage cells M of the first imaging zone A1 can be figured out by the data points having the given phases, as shown in FIG. 3A. In the signal light beams illustrated in FIGS. 3A and 3B the data storage cells having the initial reference signal points R are located at the first row of the imaging zone. However, the initial reference signal points R of the signal light beam can be arranged at different positions according to the various design, as shown in FIGS. 5A to 5H.

In the different arrangements of the initial reference signal points R, the accuracy in the reading operation of the holographic device with respect to the disk can be improved by increasing the number of the initial reference signal points R.

Figure 5C:
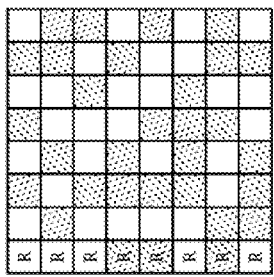
FIGS. 5A to 5I are schematic diagrams of the signal light beams according to various embodiments, in which each of the signal light beams is provided by the holographic storage device of the holographic device illustrated in FIG. 1 and has at least one initial reference signal point.
Figure 5B:
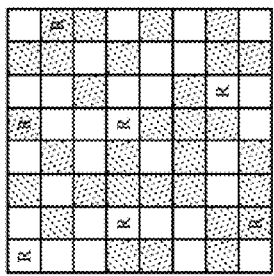
Figure 5A:
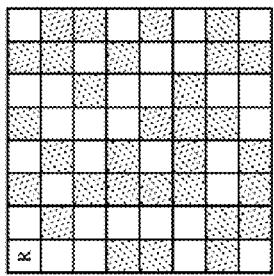
Figure 5F:
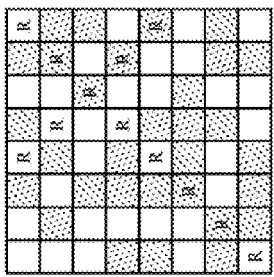
Figure 5E:
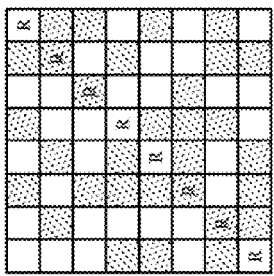
Figure 5D:
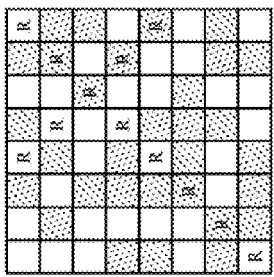

In FIG. 5A, the number of the initial reference signal point R of the signal light beam is one, in which the initial reference signal point R is located in one of the data point. In FIG. 5B, the number of the initial reference signal points R of the signal light beam is more than one, in which the initial reference signal points R are located in a plurality of the data points. In FIG. 5C, the number of the initial reference signal points R of the signal light beam is more than one, in which the initial reference signal points R are located in the same column of the imaging zone. In FIG. 5D, the number of the initial reference signal points R of the signal light beam is more than one, in which the initial reference signal points R are located in two of the columns of the imaging zone. In FIG. 5E, the number of the initial reference signal points R of the signal light beam is more than one, in which the initial reference signal points R are located in the diagonal line of the imaging zone. In FIG. 5F, the number of the initial reference signal points R of the signal light beam is more than one, in which the initial reference signal points R are arranged alternately. In FIG. 5G, the number of the initial reference signal points R of the signal light beam is more than one, in which the initial reference signal points R are located within a region of the imaging zone. In FIG. 5H, the number of the initial reference signal points R of the signal light beam is more than one, in which the initial reference signal points R are arranged to be adjacent to each other.

According to the arrangement and the number of the initial reference signal points of the signal light beam, the overlapped arrangement of the first imaging zone A1 and the second imaging zone A2 formed on the optical receiver 108 by the first light bema L1 and the second light bema L2 may be different, in which the overlapped zone of the first imaging zone A1 and the second imaging zone A2 can be adjusted by the shearing interferometer 120.

For example, in FIGS. 4A and 4B, a distance difference is preset between the first imaging zone A1 and the second imaging zone A2 formed on the optical receiver 108 by the first light bema L1 and the second light bema L2, in which the distance difference is equal to a dimension of a row or to a size of the data storage cell. In some embodiments, the shearing interferometer 120 is disposed to allow a lateral-distance difference or a longitudinal-distance difference between the first imaging zone A1 and the second imaging zone A2 is N times the minimum pixel unit of the optical receiver 108 and N is a positive integer.

Figure 5I:
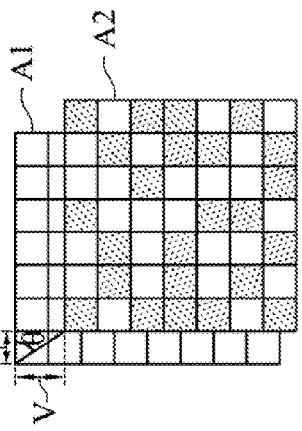
Figure 5H:
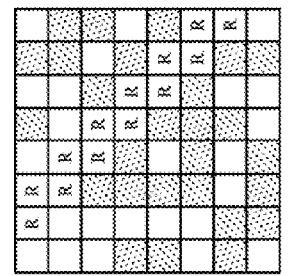
Figure 5G:
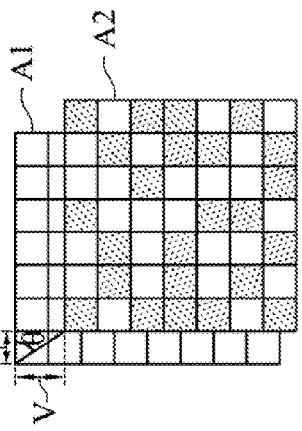

Furthermore, the lateral-distance difference and the longitudinal-distance difference can be present between the first imaging zone A1 and the second imaging zone A2 both, as shown FIG. 5I. In FIG. 5I, a longitudinal-distance difference V and a lateral-distance difference H can be present between the first imaging zone A1 and the second imaging zone A2. A ratio of the lateral-distance difference H to the longitudinal-distance difference V is equal to $\tan \theta$, and $0° \leq \theta \leq 90°$.

Figure 6:
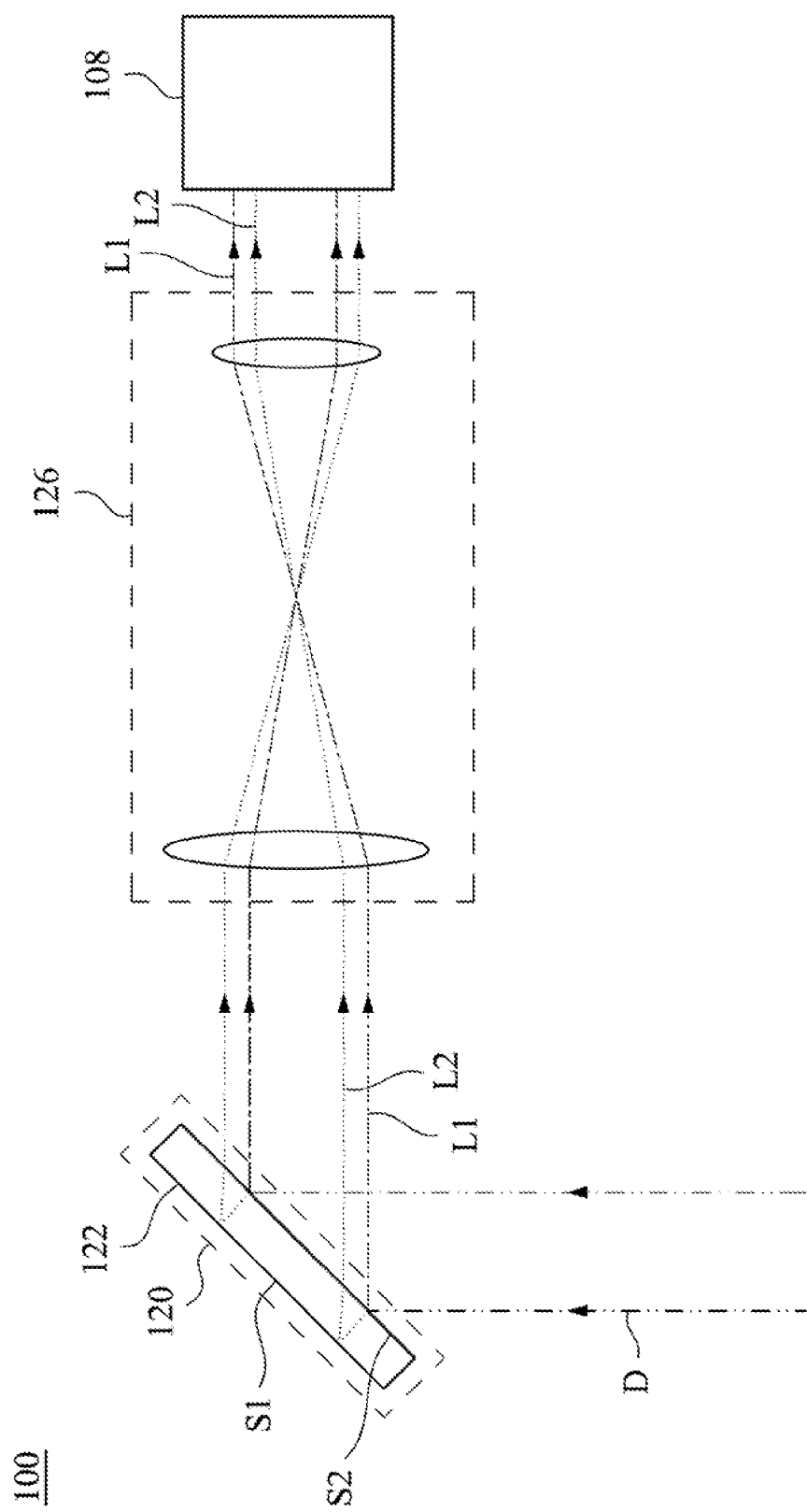
FIG. 6 is a schematic diagram of an optical path of a holographic device according to a second embodiment of this disclosure.

FIG. 6 is a schematic diagram of an optical path of holographic device 100 according to a second embodiment of this disclosure. The difference between the present embodiment and the first embodiment is that the holographic device 100 of the present embodiment further includes an afocal system 126.

When the first light beam L1 and the second light beam L2 are transformed from the diffracted light beam D by the reflective shearing plate 122, the first light beam L1 and the second light beam L2 are formed by being reflected from the first surface S1 and the second surface S2 of the reflective shearing plate 122 respectively. Since a gap is present between the first surface S1 and the second surface S2 of the reflective shearing plate 122, the images formed on the optical receiver 108 by the first light beam L1 and the second light beam L2 may be out of focus. Thus, an out of focus image may be formed.

The afocal system 126 is disposed between the shearing interferometer 120 and the optical receiver 108, in which the afocal system 126 is configured to minify the images formed on the optical receiver 108 by the first light beam L1 and the second light beam L2 which are provided by the shearing interferometer 120. In the present embodiment, the afocal system 126 can be taken as an image-minifying system. With the afocal system 126, the images formed on the optical receiver 108 can be minified, such that the formation of the out of focus image is prevented. Moreover, since the magnification of each of the first light beam L1 and the second light beam L2 in a vertical direction which is parallel to the optical axis of the afocal system 126 is square times that in a horizontal direction which is orthogonal to the optical axis of the afocal receiver 108 by the first light beam L1 and the second light beam L2 may not be affected.

Figure 7:
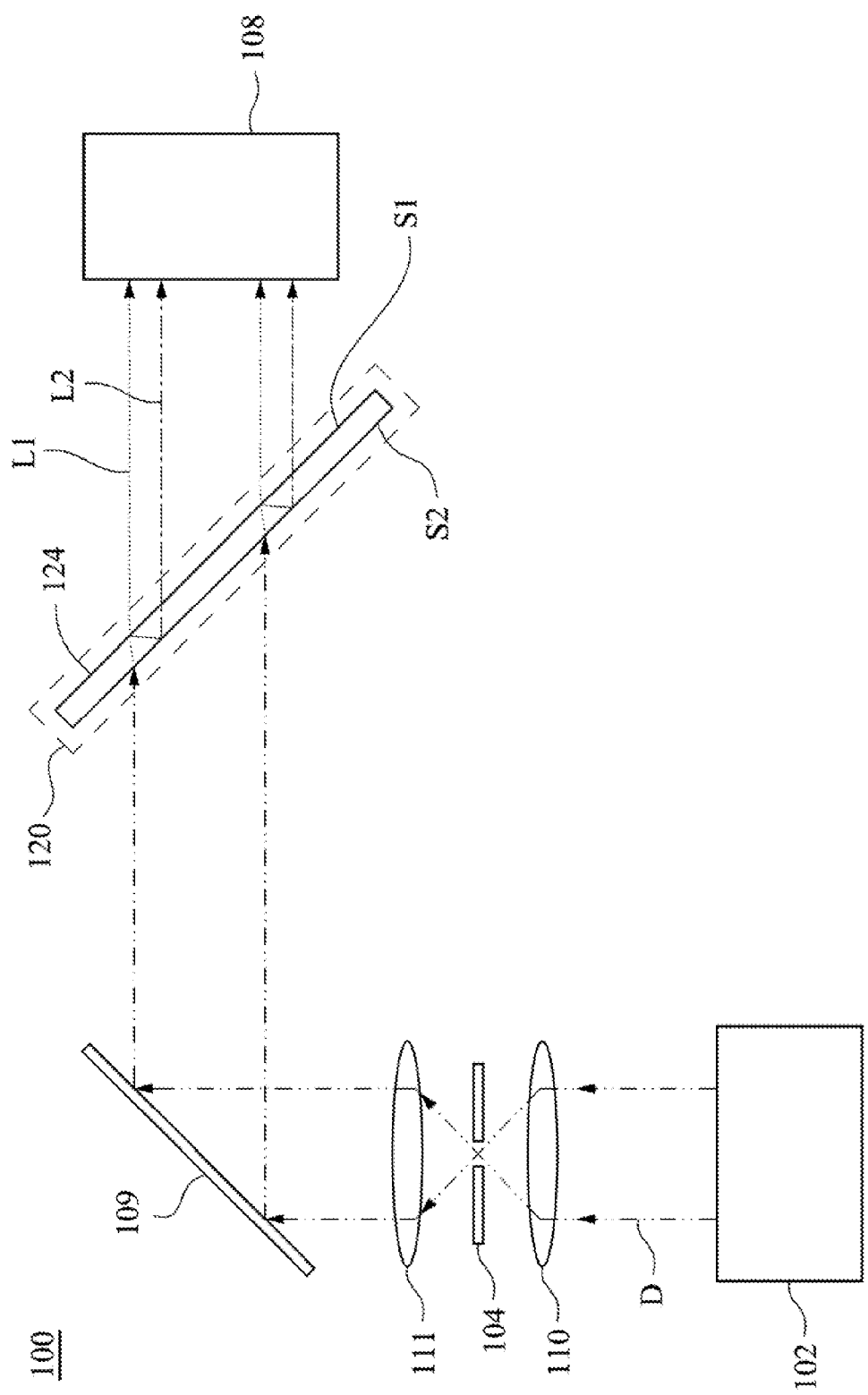
FIG. 7 is a schematic diagram of an optical path of a holographic device according to a third embodiment of this disclosure.

FIG. 7 is a schematic diagram of an optical path of a holographic device 100 according to a third embodiment of this disclosure. The difference between the present embodiment and the first embodiment is that he shearing interferometer 120 of the holographic device 100 of the present embodiment further includes a transparent shearing plate 124.

As shown in FIG. 7, the diffracted light beam D provided by the holographic storage device 102 travels to the first mirror 109 through the first lens 110, the low-pass 104, and the second lens 111, and then the diffracted light beam D is reflected from the first mirror 109 to the transparent shearing plate 124. In the present embodiment, the diffracted light beam D passing the transparent shearing plate 124 may become a first light beam L1, and the diffracted light beam D reflected by the first surface S1 and the second surface S2 of the transparent shearing plate 124 in sequence may become a second light beam L2. Next, the first light beam L1 and the second light beam L2 parallelly enter the optical receiver 108.

In addition, since a gap is present between the first surface S1 and the second surface S2 of the transparent shearing plate 124, the images formed on the optical receiver 108 by the first light beam L1 and the second light beam L2 may be an out of focus image. In order to prevent the out of focus image, an afocal system (not Must rated) can be disposed between the shearing interferometer 120 and the optical receiver 108. The afocal system can minify the images formed on the optical receiver 108 by the first light beam L1 and the second light beam L2 which are provided by the shearing interferometer 120, such that the formation of the out of focus image is prevented.

Figure 8:
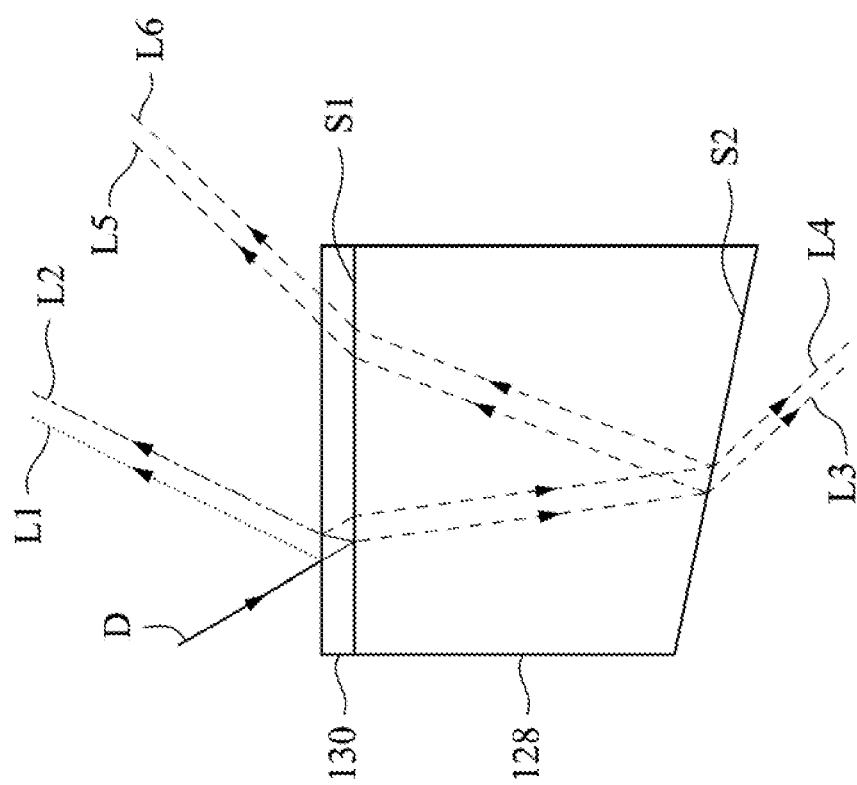
FIG. 8 is a configuration of a holographic device according to a fourth embodiment of this disclosure.

FIG. 8 is a configuration of a holographic device 100 according to fourth embodiment of this disclosure. The difference between the present embodiment and the first embodiment is that the shearing interferometer 120 of the present embodiment is formed by a transparent subtract 128 and a dielectric layer 130, while the shearing interferometer 120 of the first embodiment is the shearing plate.

The shearing interferometer 120 includes the transparent substrate 128 and the dielectric layer 130. The transparent substrate 128 has a first surface S1 and a second surface S2, in which the first surface S1 and the second surface S2 are opposite to each other and not parallel to each other. The dielectric layer 130 is disposed on the first surface S1 and is parallel to the first surface S1.

In the present embodiment, after the diffracted light beam D enters the shearing interferometer 120, the diffracted light beam D reflected from the dielectric layer 130 may become a first light beam L1, and the diffracted light beam D passing through the dielectric layer 130 and reflected from an interface between the dielectric layer 130 and the transparent substrate 128 may become a second light beam L2. With adjusting at least one condition of the dielectric layer 130, the accuracy in the reading operation of the holographic device 100 can be improved.

Thus, a thickness of the dielectric layer 130 can be determined according to the distance difference between the images formed on the optical receiver 108 (see FIG. 1) by the first light beam L1 and the second light beam L2, a phase difference between the first light beam L1 and the second light beam L2, the wavelength of the light beam provided by the light-source module 114 (see FIG. 1), the refractive index of the dielectric layer 130, and the disposed angle of the shearing interferometer 120.

The relationship among the parameters described above can be expressed by the following equations I and II:

$$w = 2T\tan\theta_1 \cos_{\theta_0} \qquad \text{Equation I}$$

$$\varphi = \frac{n_1 2\pi}{n_0 \lambda_0} \frac{2T}{\cos\theta_1} \qquad \text{Equation II}$$

where $\lambda_0$ is the wavelength of the incident light beam, w is the distance difference between the images formed on the optical receiver 108 by the first light beam L1 and the second light beam L2, $\varphi$ is the phase difference between the first light beam L1 and the second light beam L2, T is the thickness of the dielectric layer 130, $\theta_0$ is the incident angle of the incident light beam, $\theta_1$ is the refractive angle of the light beam in the dielectric layer 130, $n_1$ is the refractive index of the dielectric layer 130, and $n_0$ is the refractive index of the air.

As a condition that the distance difference between the images formed on the optical receiver 108 by the first light beam L1 and the second light beam L2 is 5 μm, the interference image can be resolved under the minimum w is 5 μm. Under a condition that w is 5 μm, $\lambda_0$ is 405 nm, $n_1$ is 1.56, $n_0$ is 1, $\varphi$ is (2N−1)pi, where N is a positive integer, according to the equations I and II, the thickness of the dielectric layer 130 can be determined by the following calculation:

$$T = \frac{w}{2\tan\theta_1 \cos_{\theta_0}} = \frac{\varphi n_0 \lambda_0 \cos\theta_1}{4\pi n_1},$$

$$\text{where } \sin 2\theta_0 = \frac{4\pi n_1^2 w}{\varphi n_0^2 \lambda_0} = 120.16/(2N+1).$$

Thus, as the incident angle is 41.6±0.2°, the phase difference between the first light beam L1 and the second light beam L2 is about pi±0.1pi and the thickness of the dielectric layer 130 is 7 μm. In other words, in some embodiments, the thickness of the dielectric layer 130 is greater than 0 μm and is smaller than or equal to 10 μm.

In addition, since the transparent substrate 128 has the first surface S1 and the second surface S2 which are opposite to each other and not parallel to each other, the ghost mage generated by the diffracted light beam D in the shearing interferometer 120 can be effectively separated, as the light beams L3, L4, L5, and L6. Since the noise caused by the ghost image can be effectively eliminated, the accuracy in the reading operation of the holographic device 100 can be improved.

Figure 9:
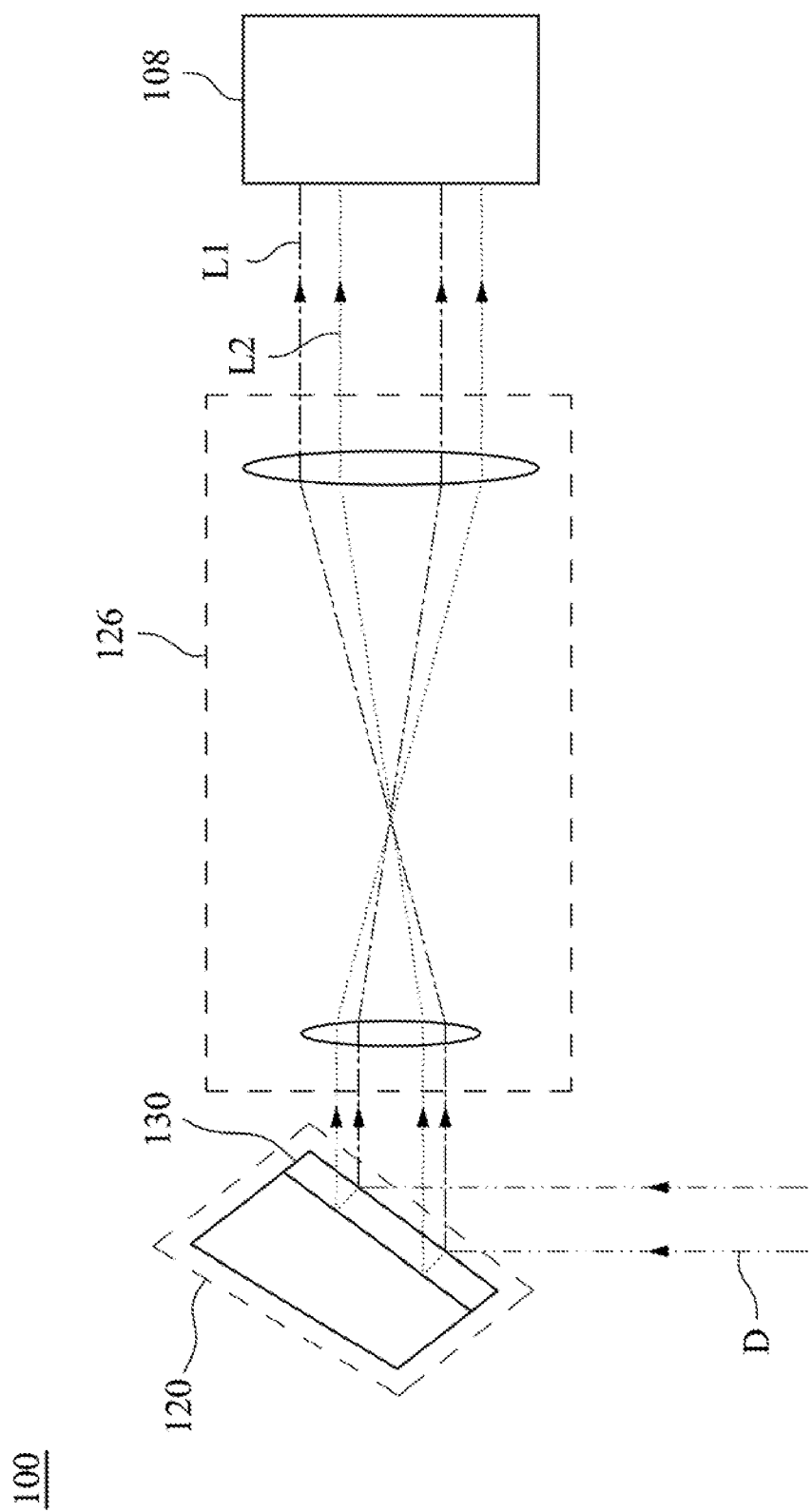
FIG. 9 is a schematic diagram of an optical path of a holographic device according to a fifth embodiment of this disclosure.

FIG. 9 is a schematic diagram of an optical path of a holographic device 100 according to a fifth embodiment of this disclosure. The difference between the present embodiment and the fourth embodiment is that the holographic device 100 further includes an afocal system 126.

According to the foregoing equation I, the relationship between the distance difference between the images formed on the optical receiver 10 by the first light beam L1 and the second light beam L2 and the thickness of the dielectric layer 130 is proportion. Thus, under the thickness of the dielectric layer 130 is remained the same, the distance difference between the images formed on the optical receiver 108 by the first light beam L1 and the second light beam L2 can be increased by an image-magnifying system.

The afocal system 126 is disposed between the shearing interferometer 120 and the optical receiver 108, in which the afocal system 126 is configured to magnify the image formed on the optical receiver 108 by the first light beam L1 and the second light beam L2 which are provided by the shearing interferometer 120. Thus, the afocal system 126 can be taken as an image-magnifying system.

With the afocal system 126, the distance difference between the images formed on the optical receiver 108 by the first light beam L1 and the second light beam L2 can be adjusted. Moreover, since the dielectric layer 130 can be taken as a thin firm, the situation that the images formed on the optical receiver 108 by the first light beam L1 and the second light beam L2 may be out of focus can be ignored.

Figure 10A:
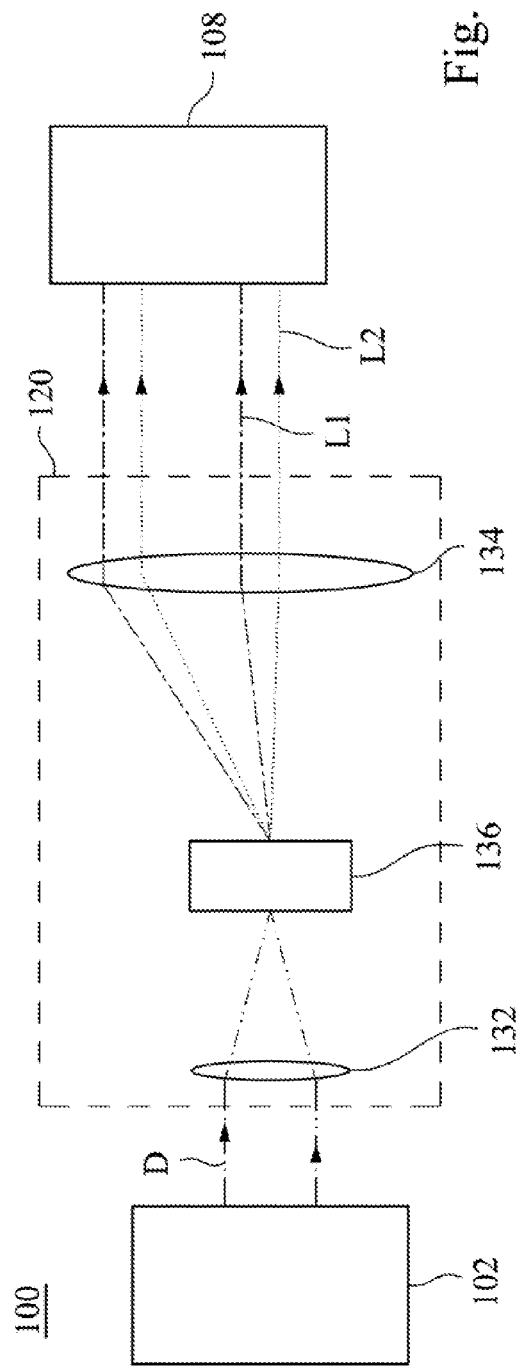
FIG. 10A is a schematic diagram of an optical path of a holographic device according to a sixth embodiment of this disclosure.
Figure 10B:
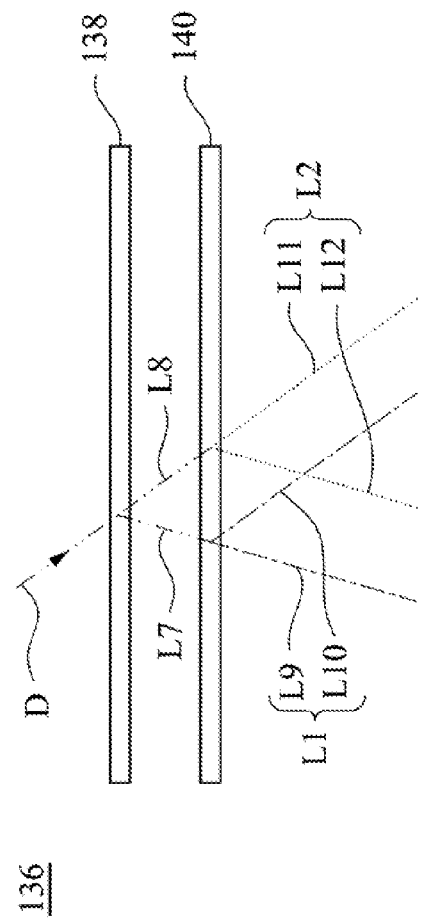
FIG. 10B is a configuration of an optical grating unit illustrated in FIG. 10A.

FIG. 10A is a schematic diagram of an optical path of a holographic device 100 according to a sixth embodiment of this disclosure. FIG. 10B is a configuration of an optical grating unit 136 illustrated in FIG. 10A. The difference between the present embodiment and the first embodiment is that the shearing interferometer 120 is formed by the a first converging lens 132, a second converging lens 134, and an optical grating unit 136.

The first converging lens 132 and the second converging lens 134 are disposed between the holographic storage device 102 and the optical receiver 108, in which the diffracted light beam D traveling from the holographic storage device 102 to the optical receiver 108 passes through the first converging lens 132 and the second converging lens 134 in sequence. The optical grating unit disposed between the first converging lens 132 and the second converging lens 134. The optical grating unit 136 includes a first optical grating 138 and a second optical grating 140. The second optical grating 140 is disposed to be parallel to the first optical grating 138, in which the diffracted light beam D traveling from the first converging lens 132 to the second converging lens 134 passes through the first optical grating 138 and the second optical grating 140 in sequence.

As shown in FIG. 10B, when the diffracted light beam D passes through the first optical grating 138, the diffracted light beam D can be transformed into a light beam L7 and a light beam L8. When the light beam L7 passes through the second optical, grating 140 the light beam L7 can be transformed into a light beam L9 and a light beam L10, in which the first light beam L1 is formed by the light beam L9 and the light beam L10 When the light beam L8 passes through the second optical grating 140, the light beam L8 can be transformed into a light beam L11 and a light beam L12, in which the first light beam L2 is formed by the light beam L11 and the light beam L12.

When the holographic storage device 102 provides the first converging lens 132 with the slanting diffracted light beam D (slanting to the optical axis of the first converging lens 132), the diffracted light beam D can be guided to the optical grating unit 136 by the first converging lens 132. Next, when the first light beam L1 and the second light beam L2 are guided to the optical receiver first imaging zone and a second imaging zone can be formed on the optical receiver 108 by the first light beam L1 and the second light beam L2, respectively.

In the present embodiment, with adjusting the horizontal distance between the first optical grating 138 and the second optical grating 140 of the optical grating unit 136, the distance difference between the first light beam L1 and the second light beam L2 can be changed. Furthermore, with adjusting the vertical distance between the first optical grating 138 and the second optical grating 140 of the optical grating unit 136, the phase difference between the first light beam L1 and the second light beam L2 can be changed.

Figure 11A:
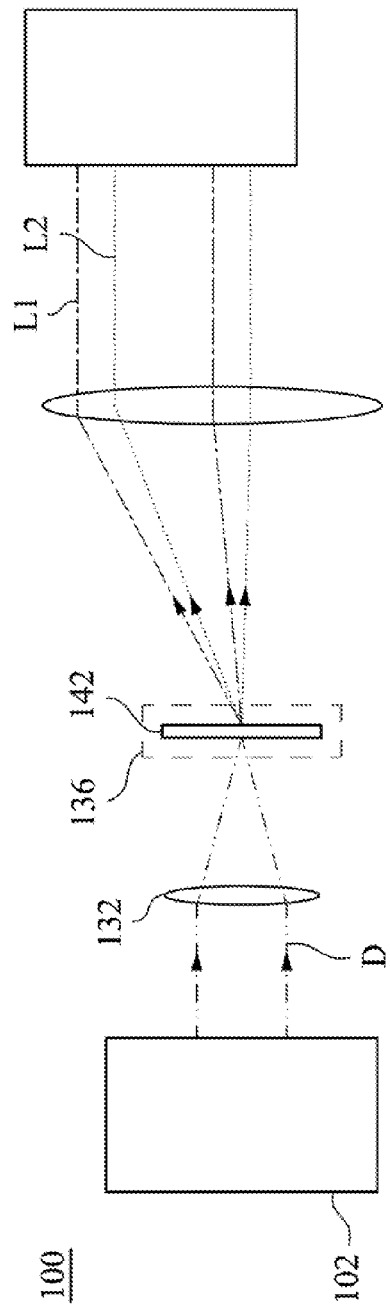
FIG. 11A is a schematic diagram of an optical path of a holographic device according to a seventh embodiment of this disclosure.
Figure 11B:
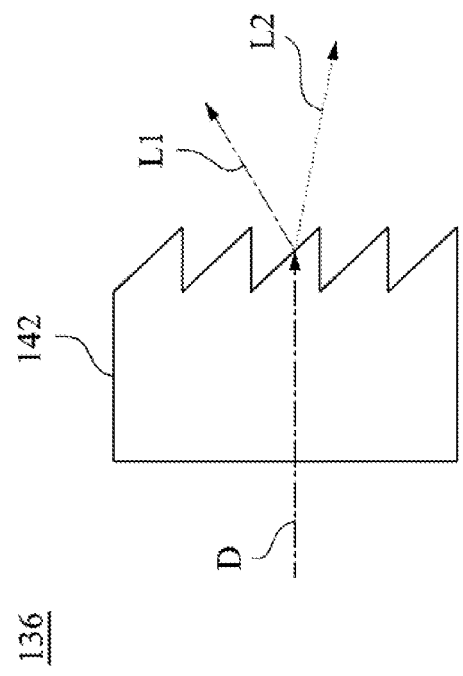
FIG. 11B is a configuration of the optical grating unit illustrated in FIG. 11A.

FIG. 11A is a schematic diagram of an optical path of a holographic device 100 according to a seventh embodiment of this disclosure. FIG. 11B is a configuration of an optical grating unit 136 illustrated in FIG. 11A. The difference between the present embodiment and the sixth embodiment is that the optical grating unit 136 of the present embodiment includes a blazed grating 142.

In the present embodiment, the blazed grating 142 can transform the diffracted light beam D entering therein into light beams with different orders, such that the diffracted light beam D can be transformed into a first light beam L1 and a second light beam L2. In addition, the holographic storage device 102 provides the first converging lens 132 with the diffracted light beam D, in which diffracted light beam D is parallel to the optical axis of the first converging lens 132.

Figure 12:
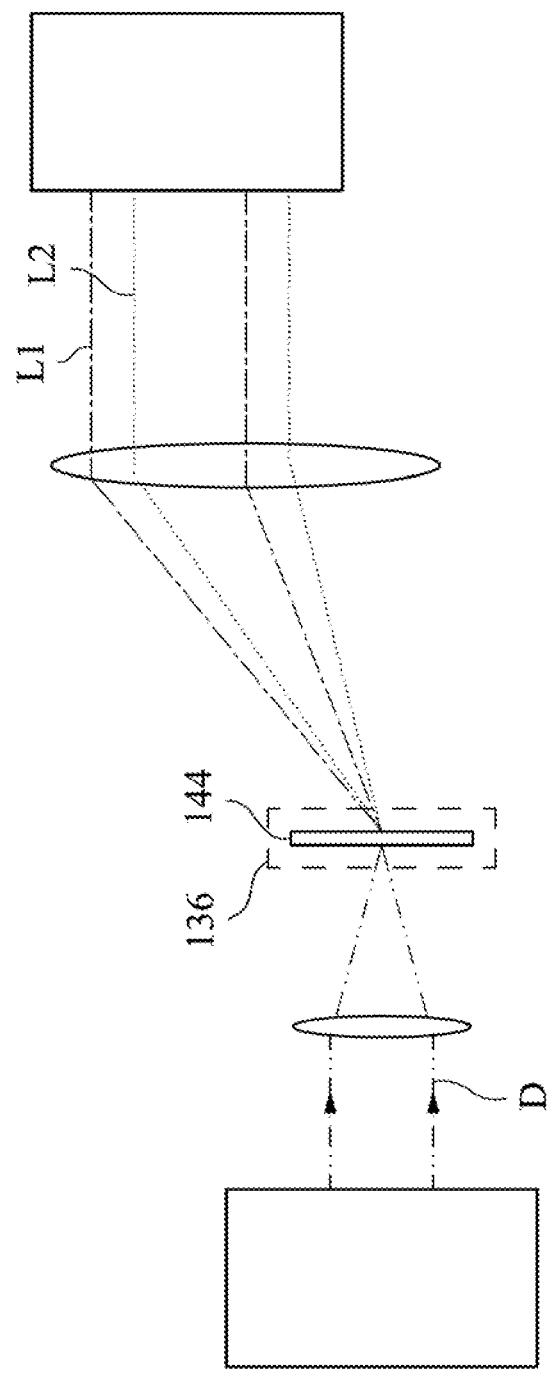
FIG. 12 is a schematic diagram of an optical path of a holographic device according to an eighth embodiment of this disclosure.

FIG. 12 is a schematic diagram of an optical path of a holographic device 100 according to an eighth embodiment of this disclosure. The difference between the present embodiment and the sixth embodiment is that the optical grating unit 136 of the present embodiment includes a double frequency grating 144.

In the present embodiment, the double frequency grating 144 can transform the diffracted light beam D entering therein into light beams with two spatial frequencies, such that the diffracted light beam D can be transformed into a first light beam L1 and a second light beam L2. In addition, controlling the two spatial frequencies can change the phase difference between the first light beam L1 and the second light beam L2.

As descried above, the holographic device of the present disclosure can transform the diffracted light beam into the first light beam and the second light beam through the shearing interferometer. The first light beam and the second light beam are partially overlapped to each other to form the overlapped zone on the optical receiver, in which the overlapped zone is expressed in the intensity distribution. With the data point corresponding to the initial reference signal point within the first imaging zone and the second imaging zone formed on the optical receiver by the first light beam and the second light beam, the phases of the first data storage cells of the first imaging zone can be calculated by the data point having the given phase. After the phases of the first data storage cells of the first imaging zone are calculated, the holographic device can read and obtain the data stored in a disk.

With the method for data reading of the present disclosure, the optic receiver can read and obtain the phase information stored in the disk by reading the diffracted light beam once, such that the time of reading the disk by the holographic device is shortened. Moreover, under the reading time is shortened, the holographic device still can obtain the data in high quality, such that the reading performance and the reading efficiency of the holographic device are improved.

Furthermore, the overlapped zone of the first imaging zone and the second imaging zone formed on the optical receiver by the first light beam and the second light beam can be adjusted by the shearing interferometer, thereby corresponding to the different design of the holographic device. In addition, the holographic device includes the afocal system disposed to be the image-minifying or the image-magnifying system such that the images formed on the optical receiver by the first light beam and the second light beam, there by preventing the out-of-focus image and the noise.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A holographic device, comprising:
    a holographic storage, device configured to provide a disk with a reading light beam to make the reading light beam become a diffracted light beam after the reading light beam is diffracted in the disk;
    a shearing interferometer configured to receive the diffracted light beam and to transform the diffracted light beam into a first light beam and a second light beam; and
    an optical receiver configured to receive the first light beam and the second light beam provided by the shearing interferometer.

2. The holographic device of claim 1, wherein the holographic storage device comprises alight-source module disposed to provide a signal light bear and the signal light beam provided by the light-source module has an initial reference signal point.

3. The holographic device of c lair 1, wherein the shearing interferometer comprises one of a reflective shearing plate and a transparent shearing plate.

4. The holographic device of claim 3, further comprising an afocal sys e disposed between the shearing interferometer and the optical receiver, wherein the afocal system is configured to minify images formed on the optical receiver by the first light beam and the second light beam which are provided by the shearing interferometer.

5. The holographic device of claim 1, wherein the shearing interferometer comprises:
    a transparent substrate having a first surface and a second surface, wherein the first surface is opposite to and not parallel to the second surface, and
    a dielectric layer disposed on the first surface and being parallel to the first surface.

6. The holographic device of claim 5, wherein a thickness of the dielectric layer is greater than 0 µm and is smaller than or equal to 10 µm.

7. The holographic device of claim 5, further comprising an afocal system disposed between the shearing interferometer and the optical receiver, wherein the afocal system is configured to magnify an image formed on the optical receiver by the first light beam and the second light beam which are provided by the shearing interferometer.

8. The holographic device of claim 1, further comprising:
    a first lens;
    a second lens, wherein the first lens and the second lens are disposed between the holographic storage device and the shearing interferometer, and the diffracted light beam traveling from the holographic storage device to the shearing interferometer passes through the first lens and the second lens in sequence; and
    a low-pass filter disposed between the first lens and the second lens.

9. The holographic device of claim 1, wherein imaging zones formed on the optical receiver by the first light beam and the second light beam provided by the shearing interferometer are a first imaging zone and a second imaging zone respectively, the first imaging zone and the second imaging zone have the same size, and the first imaging zone is partially overlapped with the second imaging zone.

10. The holographic device of claim 9, wherein a longitudinal-distance difference and a lateral-distance difference are present between the first imaging zone and the second imaging zone, and a ratio of the lateral-distance difference to the longitudinal-distance difference is equal to $\tan \theta$, wherein $0° \leq \theta \leq 90°$.

11. The holographic device of claim 9, wherein the shearing interferometer is disposed to allow a lateral-distance difference or a longitudinal-distance difference between the first imaging zone and the second imaging zone is N times the minimum pixel unit of the optical receiver, and N is a positive integer.

12. The holographic device of claim 1, wherein the shearing interferometer is formed by a first converging lens, a second converging lens, and an optical grating unit, the first converging lens and the second converging lens are disposed between the holographic storage device and the optical receiver, wherein the diffracted light beam traveling from the holographic storage device to the optical receiver passes through the first converging lens and the second converging lens in sequence, and the optical grating unit is disposed between the first converging lens and the second converging lens.

13. The holographic device of claim 12, wherein the optical grating unit comprises:
    a first optical grating; and
    a second optical grating disposed to be parallel to the first optical grating, wherein the diffracted light beam traveling from the first converging lens to the second converging lens passes through the first optical grating and the second optical grating in sequence.

14. The holographic device of claim 12, wherein the optical grating unit comprises one of a blazed grating and a double frequency grating.

15. A method for reading data by a holographic device, comprising:
    providing a disk with a signal light beam through a holographic storage device, wherein the signal light beam has an initial reference signal point such that information corresponding to the initial reference signal point is recorded in the disk;

providing the disk with a reading light beam through the holographic storage device, such that the reading light beam is diffracted in the disk to become a diffracted light beam, wherein the diffracted light beam has a data point corresponding to the initial reference signal point;

transforming the diffracted light beam into a first light beam and a second light beam which are parallel to each other through a shearing interferometer; and guiding the first light beam and the second light beam to an optical receiver, wherein imaging zones formed on the optical receiver by the first light beam and the second light beam are a first imaging zone and a second imaging zone respectively, the first imaging zone and the second imaging zone have the same size, and the first imaging zone is partially overlapped with the second imaging zone.

16. The method of claim 15, wherein the first imaging zone has a plurality of first data storage cells, and each of the first data storage cells has one of a first phase and a second phase, wherein the second imaging zone has a plurality of second data storage cells, and each of the second data storage cells has one of the first phase and the second phase, wherein the first data storage cells and the second data storage cells which are present in the overlapped zone of the first imaging zone and the second imaging zone are fully overlapped with each other.

17. The method of claim 16, further comprising:
transforming the first light beam and the second light beam provided by the shearing interferometer from a phase distribution into a intensity distribution through interference according to the first data storage cells and the second data storage cells which are fully overlapped with each other in the overlapped zone of the first imaging zone and the second imaging zone.

18. The method of claim 17, wherein the step of transforming the first light beam and the second light beam provided by the shearing interferometer from the phase distribution into the intensity distribution through the interference further comprises:

defining the intensity of a set of the first data storage cell and the second data storage cell which are fully overlapped with each other on the optical receiver as a first intensity, as the set of the first data storage cell and the second data storage cell which are fully overlapped with each other both have one of the first phase and the second phase; and defining the intensity of another set of the first data storage cell and the second data storage cell which are fully overlapped with each other on the optical receiver as a second intensity, as another set of the first data storage cell and the second data storage cell which are fully overlapped with each other have the first phase and the second phase, respectively.

19. The method of claim 17, further comprising:
calculating the phase of each of the first data storage of the fir imaging zone through the intensity distribution of the first light beam and the second light beam and the data point corresponding to the initial reference signal point after transforming the first light beam and the second light beam provided from the phase distribution into the intensity distribution.

20. The method of claim 19, wherein the step of calculating the phase of each of the first data storage cells of the first imaging zone further comprises:
calculating from the data point corresponding to the initial reference signal point in one of the first data storage cells toward the other set of the first data storage cell and the second data storage cell which are fully overlapped with each other.

21. The method of claim 15, wherein a longitudinal-distance difference and a lateral-distance difference are present between the first imaging zone and the second imaging zone, and a ratio of the lateral-distance difference to the longitudinal-distance difference is equal to tan θ, wherein $0° \leq \theta \leq 90°$.

* * * * *